(12) United States Patent
Lamb et al.

(10) Patent No.: US 7,725,473 B2
(45) Date of Patent: May 25, 2010

(54) COMMON INFORMATION MODEL

(75) Inventors: Michael L. Lamb, San Jose, CA (US); Edward M. McCrickard, Austin, TX (US); Raymond M. Swank, San Jose, CA (US); Kevin J. Webster, Tigard, OR (US); Timothy C. Willging, St. Charles, IL (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 10/739,228

(22) Filed: Dec. 17, 2003

(65) Prior Publication Data

US 2005/0138040 A1 Jun. 23, 2005

(51) Int. Cl.
G06F 7/00 (2006.01)
G06F 17/30 (2006.01)

(52) U.S. Cl. .................. 707/758; 709/223

(58) Field of Classification Search .......... 707/1, 707/100; 709/101, 223
See application file for complete search history.

(56) References Cited

U.S. PATENT DOCUMENTS

| | | | |
|---|---|---|---|
| 5,890,165 A | 3/1999 | Boudrie et al. | |
| 6,044,369 A | 3/2000 | Black | |
| 6,317,748 B1 * | 11/2001 | Menzies et al. | 707/103 X |
| 6,345,368 B1 | 2/2002 | Bergsten | |
| 6,389,432 B1 | 5/2002 | Pothapragada et al. | |
| 6,427,168 B1 | 7/2002 | McCollum | |
| 6,493,719 B1 * | 12/2002 | Booth et al. | 707/103 X |
| 6,560,591 B1 | 5/2003 | Memmott et al. | |
| 6,862,736 B2 * | 3/2005 | Hudis et al. | 719/316 |
| 6,871,346 B1 * | 3/2005 | Kumbalimutt et al. | 718/104 |
| 7,069,321 B1 * | 6/2006 | Curtis et al. | 709/225 |
| 7,328,325 B1 * | 2/2008 | Solis et al. | 711/202 |
| 2001/0027470 A1 | 10/2001 | Ulmer et al. | |
| 2002/0013808 A1 | 1/2002 | Case et al. | |
| 2002/0107872 A1 | 8/2002 | Hudis et al. | |
| 2002/0161934 A1 | 10/2002 | Johnson et al. | |
| 2002/0166002 A1 | 11/2002 | Milner et al. | |
| 2002/0184360 A1 | 12/2002 | Weber et al. | |
| 2003/0004956 A1 * | 1/2003 | Johnson et al. | 707/100 |
| 2003/0037177 A1 | 2/2003 | Sutton et al. | |
| 2003/0055808 A1 | 3/2003 | Bhat | |
| 2003/0055862 A1 * | 3/2003 | Bhat | 709/101 |
| 2003/0093509 A1 | 5/2003 | Li et al. | |
| 2003/0115296 A1 | 6/2003 | Jantz et al. | |
| 2003/0154267 A1 * | 8/2003 | Camacho et al. | 709/223 |

(Continued)

OTHER PUBLICATIONS

"Managing a Storage Array Using CIM Schema 2.7", Revision 0.14, Work-in-Progress Draft, Sep. 13, 2002, pp. 1-35, Storage Networking Industry Association, San Francisco.

(Continued)

*Primary Examiner*—Hosain T Alam
*Assistant Examiner*—Usmaan Saeed
(74) *Attorney, Agent, or Firm*—David W. Victor; Konrad Raynes and Victor LLP

(57) ABSTRACT

One aspect of the invention is a method for responding to an inquiry. An example of the method includes receiving the inquiry, obtaining information from a CIMOM, and creating at least one Storage Object. This example of the method also includes populating the at least one Storage Object with information received from the CIMOM, and sending the at least one Storage Object to a calling function.

15 Claims, 4 Drawing Sheets

U.S. PATENT DOCUMENTS

| | | | |
|---|---|---|---|
| 2003/0217195 A1* | 11/2003 | Mandal et al. | 709/330 |
| 2003/0220892 A1* | 11/2003 | Hand et al. | 707/1 |
| 2004/0073532 A1* | 4/2004 | Hiltgen et al. | 707/1 |
| 2004/0167975 A1* | 8/2004 | Hwang et al. | 709/223 |
| 2004/0181529 A1* | 9/2004 | Hiltgen et al. | 707/9 |
| 2004/0216126 A1* | 10/2004 | Hiltgen | 719/311 |
| 2004/0243945 A1* | 12/2004 | Benhase et al. | 715/853 |

OTHER PUBLICATIONS

"SNIA Storage Management Initiative Specification Version 1.0.1", Sep. 12, 2003, pp. 1-644, Storage Networking Industry Association, San Francisco.

"CIM Tutorial", Jun. 13, 2003, pp. 1-105, Distributed Management Task Force, Portland.

Groves, et al., U.S. Appl. No. 10/739,209, titled "Method and system for assigning a resource", filed Dec. 17, 2003, 24 pages plus 3 drawing sheets.

Groves et al., U.S. Appl. No. 10/739,136, titled "Method and system for assigning or creating a resource", filed Dec. 17, 2003, 33 pages plus 6 drawing sheets.

* cited by examiner

COMMON INFORMATION MODEL

BACKGROUND

1. Technical Field

The present invention relates to management and control of resources in a computing system. More particularly, the invention concerns efficiently retrieving information concerning system resources such as storage resources.

2. Description of Related Art

Modern computing systems commonly include servers, storage systems, and other devices. Management and modeling programs are often used to manage the devices in computing systems.

Storage Management Initiative Specification (SMI-S)/Bluefin, and Common Information Model (CIM) technologies, are widely used for managing storage devices and storage environments. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Volumes, Disks, Storage SubSystems, Switches, and host Computer Systems. (In many, but not all cases, the term "volume" is interchangeable with the term "Logical Unit Number" (LUN).) CIM also defines the associations that may or may not exist between these objects, such as a Disk being associated to a Storage SubSystem because it physically resides in the Storage SubSystem.

The CIM Objects mentioned above may be managed by a CIM Object Manager (CIMOM), also known as a CIM Server. A storage management software application, such as IBM Tivoli Storage Resource Manager (ITSRM), can use a CIM Client to connect to a CIMOM, to retrieve information about the storage entities that the CIMOM manages, and also to perform active configuration of the storage entities. Storage management software that uses a CIM Client may be called a CIM Client Application.

CIM Client Applications use a CIM Client API (Application Programming Interface) to communicate with a remote CIMOM. There are several CIM Client APIs available (SNIA, Pegasus, Java WBEM Services), and they all are similar in that the methods available to the CIM Client Application deal with the use of meta-data. CIM Client APIs include methods for the following common tasks:

Get all instances of a certain CIM_Class
  Example: Get all ComputerSystems
  Example: Get all Hosts
Get associated entities given a certain entity
  Example: Get All StorageVolumes that are defined in a specific Disk Array StorageSystem
  Example: Get the StoragePool that a particular StorageVolume is allocated from.

Using the CIM Client API to obtain commonly needed information from the CIMOM typically requires an excessive number of steps. As an example, Disk Array Storage Systems are modeled as ComputerSystems. The ComputerSystem's Dedicated property is used to identify the ComputerSystem as a Switch, Host, Disk Array System, or some other type of computer system. In addition, certain Disk Array information, such as Location, Model, and ProductID, are not modeled as properties of a Disk Array ComputerSystem, but rather as properties of objects associated to the ComputerSystem. Thus, to enumerate all Disk Array Systems and to get complete information about their properties, the following elaborate process is required:

1. Enumerate instances of Computer Systems;
2. Check each ComputerSystem's Dedicated property to identify if it is a Disk Array System;
3. Get the pertinent properties of the Disk Array Computer System, such as Name, Description, and Status;
4. Get the associated PhysicalPackage object;
5. Get the Product object that is associated to the PhysicalPackage object;
6. Get the pertinent properties from the Product object, such as Name, Version, and Vendor;
7. Get the Location object that is associated to the PhysicalPackage object; and
8. Get the pertinent location information from the Location object.

Thus, this process requires an overly complex set of steps to discover and get the properties of Disk Array Computer Systems.

Additionally, when using the CIM Client API, it is not possible to get information about a top-level entity and all of its components in one step. Component entities are modeled as separate objects, so an extra step is required to get information for each additional type of component object that the CIM Client Application is interested in. To get information about a Disk Array System and information about a specific subset of its components (Volumes, Storage Pools, FCPorts), the CIM Client must perform the following operations:

1. Get information about the Disk Array System as described above;
2. Get the associated StorageVolume objects through SystemDevice associations;
3. Get the associated StoragePool objects through HostedStoragePool associations; and
4. Get the associated FCPort (Fibre Channel Port) objects through SystemDevice associations.

Thus, the process for obtaining information about a Disk Array System and its components is overly complex.

In summary, known methods for using CIM Client Applications to obtain information pertaining to a single storage entity that may be distributed through several objects in the CIM/SMIS model, are complex and require too many steps. Additionally, known methods for CIM Client Applications to obtain a top-level object and all of its components are excessively difficult. Further, with known methods, CIM Client Applications are unable to easily retrieve a complete view of a top level object and its components, because WBEM (or CIM-XML) only allows for requests for targeted pieces of information.

SUMMARY

One aspect of the invention is a method for responding to an inquiry. An example of the method includes receiving the inquiry, obtaining information from a CIMOM, and creating at least one Storage Object. This example of the method also includes populating the at least one Storage Object with information received from the CIMOM, and sending the at least one Storage Object to a calling function.

Other aspects of the invention are described in the sections below, and include, for example, a computing system, and a signal bearing medium tangibly embodying a program of machine-readable instructions executable by a digital processing apparatus to perform a method for responding to an inquiry.

Some examples of the invention provide one or more of the following advantages:
1. Permitting a CIM Client Application to get all properties of a storage entity in one step, even though the properties of the storage entity may span several separate CIM Objects in a CIMOM.
2. Permitting a CIM Client Application to retrieve complete information for a top level object (such as a Disk Array System) and all of its components in one step.
3. Permitting a CIM Client Application to get targeted information regarding associations between top-level and component entities or between a component entity and another component entity, without requiring the CIM Client Application to retrieve complete information for the top-level entity.

Some examples of the invention also provide a number of other advantages and benefits, which should be apparent from the following description.

DETAILED DESCRIPTION

Figure 1:
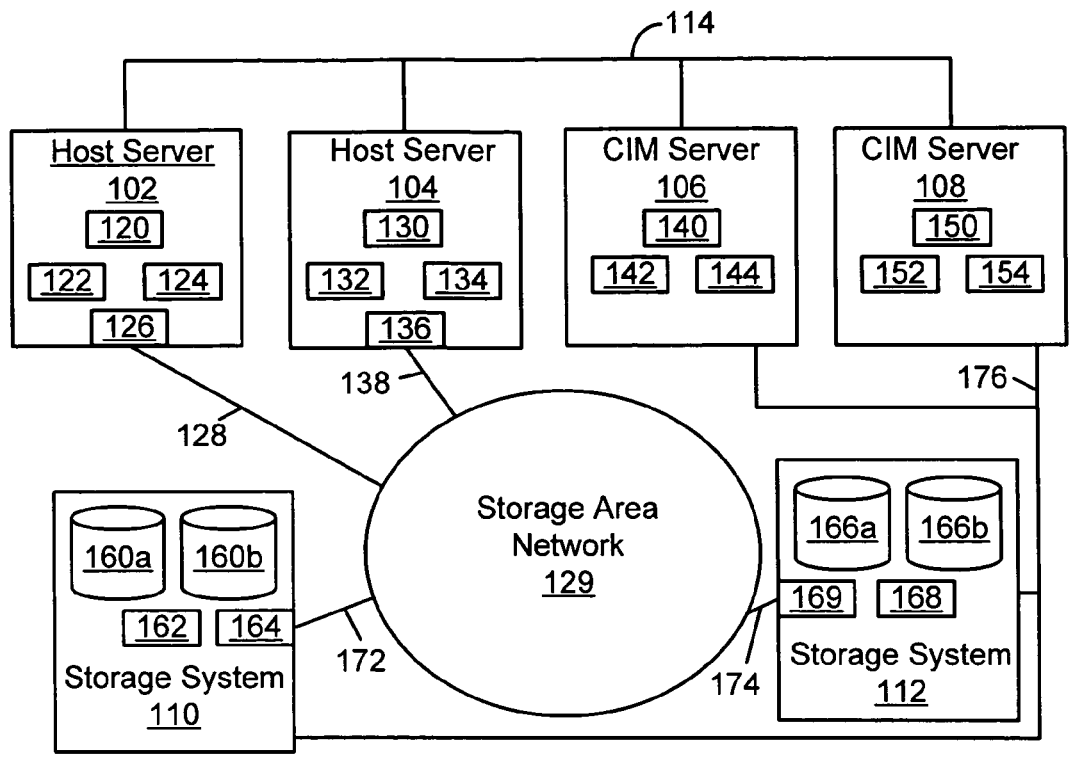
FIG. 1 is a block diagram of the hardware components and interconnections of a computing system in accordance with an example of the invention.

The nature, objectives, and advantages of the invention will become more apparent to those skilled in the art after considering the following detailed description in connection with the accompanying drawings.

I. Hardware Components and Interconnections

One aspect of the invention is a computing system that can be used for responding to an inquiry, for example, for managing resources associated with the computing system. As an example, the resources may be storage resources. The computing system may be embodied, for example, by all or portions of the computing system 100 shown in FIG. 1. The computing system 100 includes a first host server 102, a second host server 104, a first CIM server 106, a second CIM server 108, a first storage system 110, and a second storage system 112. (The host servers 102, 104 may be called hosts 102, 104.) Alternatively, in this embodiment and in the other embodiments discussed below, only one host could be included, or additional hosts could be included, and/or client computers could be included. Also, in this embodiment and in the other embodiments discussed below, only one CIM server could be included, or additional CIM servers could be included, or one or more CIM servers could be embedded in other devices. Also, in this embodiment or in the other embodiments discussed below, one or more ITSRM servers (not shown) could be included. The CIM servers 106, 108 may each be called a CIM Object Manager (CIMOM). Each host 102, 104, and the CIM servers 106, 108 may run the same or different operating systems, which could be any suitable operating system(s), for example, Windows 2000, AIX, Solaris™, Linux, UNIX, or HP-UX™. Each host 102, 104, and the CIM servers 106, 108 may be implemented with any suitable computing device, and may be implemented with the same, or different computing devices. As an example, hosts 102, 104 and CIM servers 106, 108 each could be a personal computer (having for example, an Intel processor running the Windows or Linux operating system), a computer workstation, a mainframe computer, a supercomputer (for example an IBM SP2 running the AIX operating system), or any other suitable computing device running any suitable operating system. In other examples, the hosts 102, 104, and the CIM servers 106, 108 each could be an IBM xSeries server, or an IBM zSeries Parallel Sysplex server, such as a zSeries 900, running the z Operating System (z/OS), Windows 2000, Linux, or AIX, or could be an IBM S/390 server running OS/390. Hosts 102, 104 and CIM servers 106, 108 could also run Tivoli Storage Manager (TSM), which is available from IBM Corporation. The hosts 102, 104, and the CIM servers 106, 108 may be coupled to each other with a network 114, which may be an IP network, and which may use any suitable type of communications channel technology, for example, Ethernet, ESCON (Enterprise Systems CONnnector), or FICON (FIber CONnector). Additionally, network 114 could use the Internet, and could utilize wireless technology.

The host 102 has a processor 120 (which may be called a processing device), and in some examples could have more than one processor. As an example, the processor 120, may be a PowerPC RISC processor or an IBM P690 power 4 processor, available from International Business Machines Corporation. In another example, the processor 120 could be a processor manufactured by Intel Corporation. The host 102 also may have a memory subsystem that may include a primary memory 122 (for example RAM), and/or a non-volatile memory 124, both of which are coupled to the processor 120. The memory subsystem may be used to store data and application programs and/or other programming instructions executed by the processor 120. The application programs could include a CIM Client Application and could generally be any suitable applications. The CIM Client Application may have knowledge of, and may establish connections with, one or more of the CIM servers 106, 108.

The non-volatile memory 124 could be, for example, a hard disk drive, a drive for reading and writing from optical or magneto-optical media, a tape drive, non-volatile RAM (NVRAM), or any other suitable type of storage. In some examples the primary memory 122 or the non-volatile memory 124 could be eliminated, or the primary memory 122 and/or the non-volatile memory 124 could be provided on the processor 120, or alternatively, external from the host 102. The host 102 also has a hardware bus adapter (HBA) 126, coupled to the processor 120, for coupling the host 102 via connector 128 to a Fibre Channel network (which may be called a "fabric) that may be used to implement a SAN 129. As an example, connector 128 may support FICON (FIber CONnector), ESCON (Enterprise Systems CONnnector) communications channels. As an example, the hardware bus adapter 128 could be a model 2200 hardware bus adapter available from QLogic Corporation. Generally, the SAN 129 may be implemented using Fibre Channel network(s) and/or Ethernet network(s). As will be discussed below, in other embodiments a SAN need not be included. Using the SAN 129 permits coupling a large number of storage devices to the hosts 102, 104.

Similar to host 102, host 104 has a processor 130, a memory subsystem that that may include a primary memory 132 (for example RAM), and/or a non-volatile memory 134, both of which are coupled to the processor 130. The memory subsystem may be used to store data and application programs and/or other programming instructions executed by the processor 130. The application programs could include a CIM Client Application and could generally be any suitable applications. The host 104 also has a hardware bus adapter 136, coupled to the processor 130, for coupling the host 104, via connector 138 (which may be similar to connector 128), to the Fibre Channel network that may be used to implement the SAN 129. In an alternative embodiment, SCSI protocol, rather than Fibre Channel protocol, could be used to couple the hosts 102, 104 to the SAN 129.

Similar to hosts 102, 104, CIM Server 106 has a processor 140, a memory subsystem that may include a primary memory 142 (for example RAM), and/or a non-volatile memory 144, both of which are coupled to the processor 140. The memory subsystem may be used to store data and application programs and/or other programming instructions executed by the processor 140. The application programs could generally be a CIM Object Manager program, and any other suitable applications. In some embodiments the CIM server 106 could be coupled to the SAN 129, and consequently, CIM server 106 could also have a hardware bus adapter for coupling the CIM server 106 to the Fibre Channel network that may be used to implement the SAN 129.

Similar to the first CIM server 106, the second CIM server 108 has a processor 150, a memory subsystem that may include a primary memory 152 (for example RAM), and/or a non-volatile memory 154, both of which are coupled to the processor 150. The memory subsystem may be used to store data and application programs and/or other programming instructions executed by the processor 150. The application programs could generally be a CIM Object Manager program, and any other suitable applications. In some embodiments the CIM server 108 could be coupled to the SAN 129, and consequently, CIM server 108 could also have a hardware bus adapter for coupling the CIM server 108 to the Fibre Channel network that may be used to implement the SAN 129.

Storage system 110 includes storage devices 160*a*, 160*b*, storage controller 162, and hardware bus adapter 164. Similarly, storage system 112 includes storage devices 166*a*, 166*b*, controller 168, and hardware bus adapter 169. The storage systems 110, 112 could include additional storage devices. Storage system 110 is coupled to the SAN 129 via connector 172, and storage system 112 is coupled to the SAN 129 via connector 174. Connectors 172 and 174 may be similar to connectors 128 and 138 discussed above. There may be multiple paths to the storage systems 110, 112 in the SAN 129. Generally, a large number of storage systems may be coupled to the SAN 129. Also, storage devices that are not in storage systems could be coupled directly to the SAN 129, or could be coupled to the SAN 129 through a switch (not shown). The CIM servers 106, 108 are coupled to the storage systems 110, 112 via a network 176, which may be an IP network, and which may use any suitable type of communications technology such as discussed above with regard to network 114.

The storage devices 160*a-b*, 166*a-b* may be, for example, hard drives. However, each of the storage devices 160*a-b*, 166*a-b* could be implemented with any suitable type of storage device, using any suitable technology, such as magnetic, optical, magneto-optical, or electrical. For example, suitable storage devices could include hard disk drives, optical disks or discs (for example, CD-RW, DVD-RW, or DVD+RW), floppy disks, magnetic data storage disks or diskettes, magnetic tape, digital optical tape, a tape library, EPROMs, EEPROMs, RAM, Non-Volatile RAM, and flash memory. Additionally, CD-R, WORM, DVD-R, and/or DVD+R devices could be included in the plurality storage devices. As an example, one or more of the storage systems 110, 112 could be implemented with a model F20 or model 800 Enterprise Storage Server, available from IBM Corporation. As another example, disk storage could be implemented with an IBM FAStT 900, and a tape library could be implemented with an IBM 3494 tape library using IBM 3590 drives, all of which are available from IBM Corporation.

Figure 2:
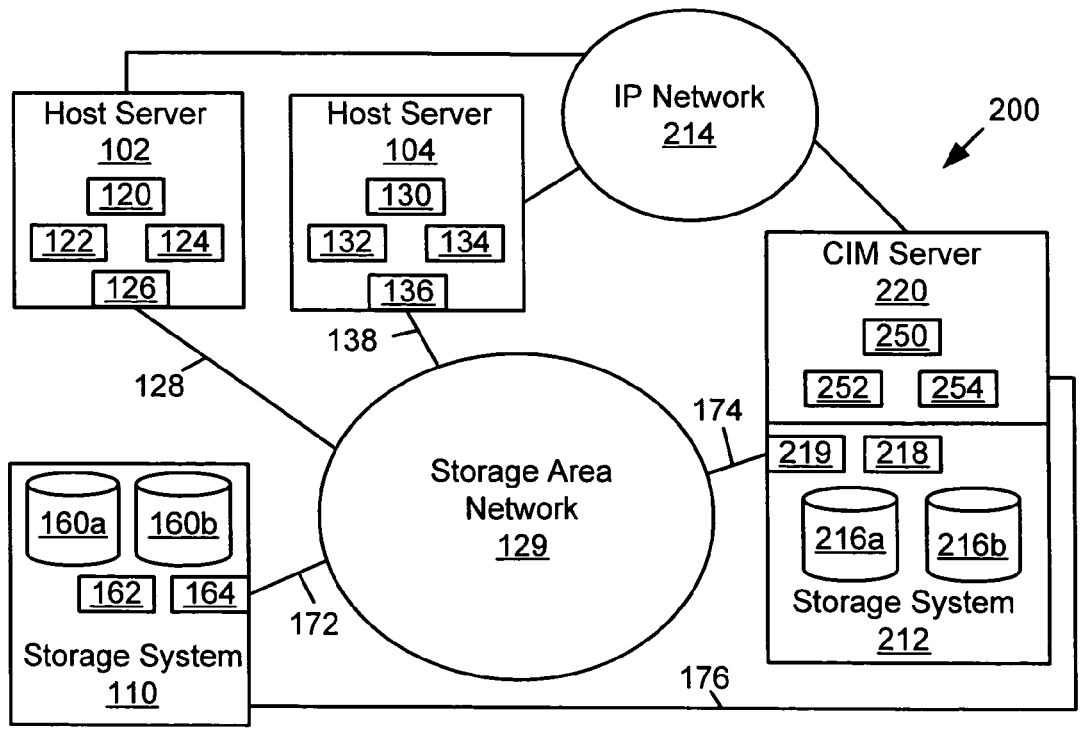
FIG. 2 is a block diagram of the hardware components and interconnections of a computing system in accordance with an example of the invention.

An alternative computing system 200 is shown in FIG. 2. All or portions of the computing system 200 could be used to implement one or more examples of the invention. Computing system 200 includes host servers 102, 104, storage systems 110, 212, SAN 129, and IP network 214. Storage system 212 includes storage devices 216*a*, 216*b*, storage controller 218, and hardware bus adapter 219. The storage devices 216*a-b* may be any of the types of storage devices discussed above with regard to storage devices 160*a-b*, 166*a-b*. Storage system 212 further includes embedded CIM server 220. Thus, computing system 200 does not have a proxy CIM server, and the CIM server 220 is embedded in the storage system 212. CIM Server 220 has a processor 250, a memory subsystem that may include a primary memory 252 (for example RAM), and/or a non-volatile memory 254, both of which are coupled to the processor 250. The memory subsystem may be used to store data and application programs and/or other programming instructions executed by the processor 220. The application programs could generally be a CIM Object Manager program, and any other suitable applications. In the computing system 200, hosts 102, 104 and the CIM server 220 in storage system 212 are connected through the IP network 214. IP network 214 may use any suitable type of communications channel technology, for example, Ethernet, ESCON (Enterprise Systems CONnnector), FICON (FIber CONnector). Additionally, network 214 could use the Internet, and could utilize wireless technology.

Figure 3:
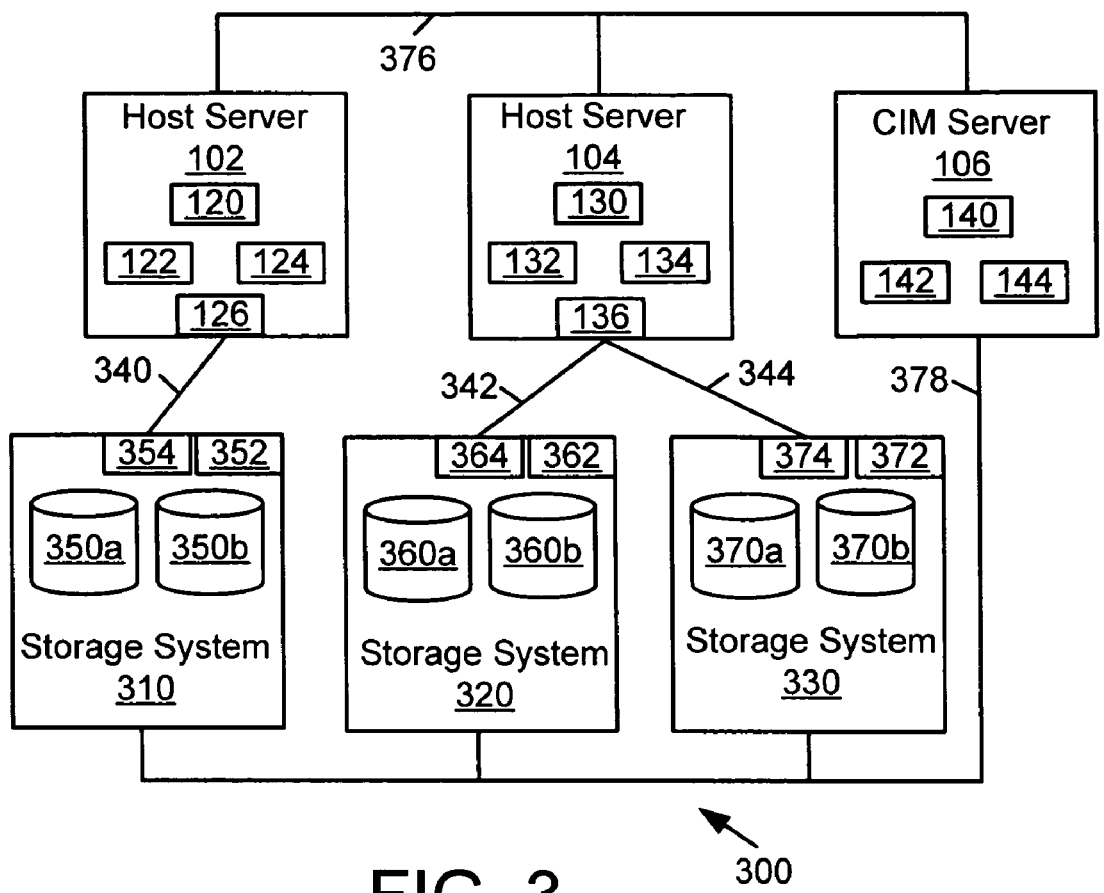
FIG. 3 is a block diagram of the hardware components and interconnections of a computing system in accordance with an example of the invention.

Another alternative computing system 300 is shown in FIG. 3. All or portions of the computing system 300 may be used to implement one or more examples of the invention. Computing system 300 includes host servers 102, 104, CIM server 106, and storage systems 310, 320, 330. Storage system 310 includes storage devices 350*a*, 350*b*, storage controller 352, and hardware bus adapter 354. Similarly, storage system 320 includes storage devices 360*a*, 360*b*, storage controller 362, and hardware bus adapter 364. Similarly, storage system 330 includes storage devices 370*a*, 370*b*, storage controller 372, and hardware bus adapter 374. The storage devices 350*a-b*, 360*a-b*, 370*a-b* may be any of the types of storage devices discussed above with regard to storage devices 160*a-b*, 166*a-b*. In the computing system 300, hosts 102, 104 and the CIM server 106 are connected through an IP network 376 which is similar to the network 114 discussed above. Hardware bus adapter 126 in host 102 couples host 102 to storage system 310 via connector 340 and the hardware bus adapter 354 in storage system 310. Similarly, hardware bus adapter 136 in host 104 couples host 104 to storage system 320 via connector 342 and the hardware bus adapter 364 in storage system 320, and also couples host 104 to storage system 330 via connector 344 and the hardware bus adapter 374 in storage system 330. As an example, connectors 340, 342, and 344 may support any suitable type of communications channel technology, for example, FICON (FIber CONnector), ESCON (Enterprise Systems CONnnector), or SCSI (Small Computer System Interface). CIM server 106 is coupled to storage systems 310, 320, and 330 via network 378, which may be an IP network, and which may use any suitable type of communications channel technology, for example, Ethernet, ESCON (Enterprise Systems CONnnector), or FICON (FIber CONnector). Additionally, network 378 could use the Internet, and could utilize wireless technology.

II. Operation

In addition to the hardware embodiments described above, another aspect of the invention concerns a method for responding to an inquiry.

A. Signal-Bearing Media

In the context of FIGS. 1-3 the method aspect of the invention may be implemented, for example, by having host 102, host 104, CIM server 106, CIM server 108, or CIM server 220 execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for responding to an inquiry.

Figure 4:
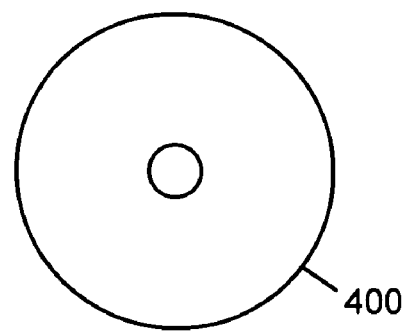
FIG. 4 is an example of a signal-bearing medium in accordance an example of the invention.

This signal-bearing medium may comprise, for example, primary memory 122 and/or non-volatile memory 124, primary memory 132 and/or non-volatile memory 134, primary memory 142 and/or non-volatile memory 144, primary memory 152 and/or non-volatile memory 154, and/or, primary memory 252 and/or non-volatile memory 254. Alternatively, the instructions may be embodied in a signal-bearing medium such as the optical data storage disc 400 shown in FIG. 4. The optical disc can be any type of signal bearing disc or disk, for example, a CD-ROM, CD-R, CD-RW, WORM, DVD-R, DVD+R, DVD-RW, or DVD+RW. Additionally, whether contained in the computing system 100, 200 or 300, or elsewhere, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", or may comprise Java bytecode.

B. Main Functional Units

Figure 5:
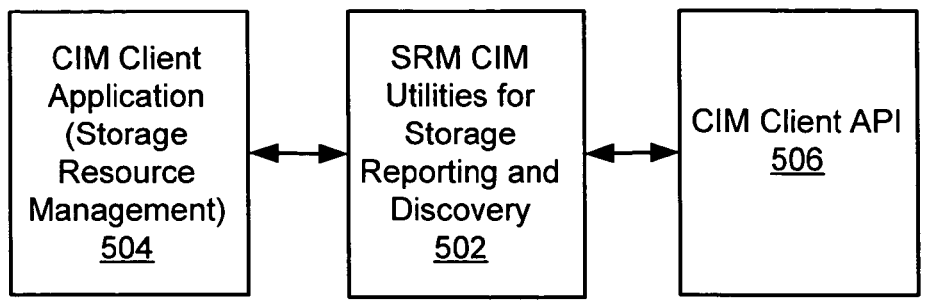
FIG. 5 is a block diagram showing the relationship between SRM CIM Utilities, a CIM Client Application, and a CIM Client API, in accordance with an example of the invention.

Referring to FIG. 5, some examples of the invention may be called "SRM CIM Utilities for Storage Reporting and Discovery" 502, referred to as the "SRM Client CIM Utilities". The SRM CIM Utilities 502 is a set of code modules that is an intermediary between a CIM Client Application 504 on one end and a CIM Client API 506 on the other end. The CIM Client API 506 is the interface to a library that the SRM CIM Utilities 502 use, and may be called the CIM Client library. The SRM CIM Utilities 502 simplifies and abstracts the Common Information Model for Storage and the CIM Client API 506, allowing Storage Resource Management CIM Client Applications 504 to more easily retrieve information about storage resources from a CIMOM 106, 108. A CIMOM can be used for managing many types of resources. Consequently, any resources managed by CIMOMs may benefit by the SRM CIM Utilities 502 as described herein for some examples of the invention. The SRM CIM Utilities 502 may be used specifically for Storage Resource Management, but also could be used for SAN Management through CIM, or for management of other resources or networks through CIM. For example, the SRM CIM Utilities 502 could be used to manage one or more of any of the following:

a Fibre Channel switch;
a tape library;
an inband virtualization device, for example, an IBM SAN volume controller, (wherein the server virtualizes volumes and is accessed as a disk array device);
an out of band virtualization device;
a HBA (host bus adapter) on another host;
a router; or
network attached storage.

Figure 6:
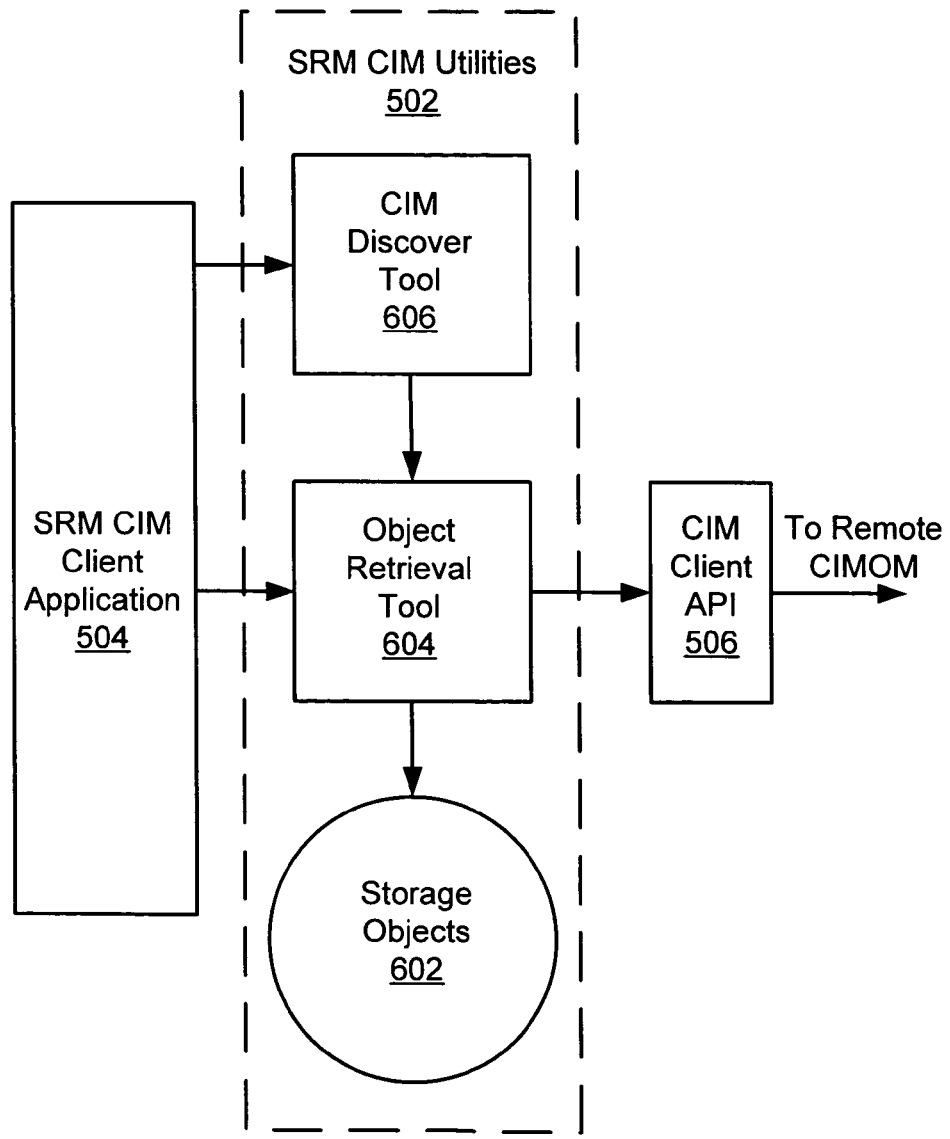
FIG. 6 is a block diagram showing the relationship between components of SRM CIM Utilities, a CIM Client Application, and a CIM Client API, in accordance with an example of the invention.

FIG. 6 illustrates the three main functional units (also called parts) of the SRM CIM Utilities 502, which are: Storage Objects 602, an Object Retrieval Tool 604, and a CIM Discover Tool 606. The three parts interoperate with each other and with the CIM Client Application 504 and the CIM Client API 506.

Storage Objects 602:

The following is a discussion of the Storage Objects 602: The Storage Objects 602 are a Java package comprised of classes that define several storage entity objects, including Disk Array Systems, Storage Pools, Volumes, Host Systems, FCPorts, and Disks. In alternative embodiments, programming languages other than Java could be used. In an example of the SRM CIM Utilities 502 managing a Disk Array System, the Disk Array System is the top level object, with all other objects being associated as a component of the top level object or as a subcomponent of another component object. The Storage Objects' associations to each other reflect the storage entities' relationships as they are modeled in SNIA SMI/Bluefin Profiles. The properties of the Storage Objects directly map to the properties of the CIM Classes that are used to represent the storage entity. For example, the Storage Objects' DiskArraySystem objects' properties map directly to properties defined in the following CIM classes: CIM_ComputerSystem, CIM_Product, and CIM_Location. The Storage Objects' Volume object's properties map directly to properties defined in the CIM_StorageVolume class.

The following operations may be performed to produce the Storage Objects 602: Identify entities and subcomponent entities of a class of device to be managed. For example, if managing a disk array, identify the disk array and attached entities, for example disks and volumes. Also, identify the parent-child relationships between the entities. As an example, a disk may be a child of a storage pool, and the storage pool and the disk may be children of a disk array.

Object Retrieval Tool 604:

The following is a discussion of the Object Retrieval Tool 604: The Object Retrieval Tool 604 is a Java module or set of Java modules that allows callers to make small and specific inquiries concerning storage entities that are managed by a CIMOM 106, 108. In alternative embodiments, programming languages other than Java could be used. The Object Retrieval Tool 604 may be called directly by the SRM CIM Client 504 Application or by the CIM Discover Tool 606.

For each inquiry that the Object Retrieval Tool 604 receives, the Object Retrieval tool 604 does the following:

1. The Object Retrieval Tool 604 uses the CIM Client API 504 to get the requested information from the CIMOM 106, 108;
2. The Object Retrieval Tool 604 creates a Storage Object or a set of Storage Objects 602;
3. The Object Retrieval Tool 604 populates the Storage Object(s) 602 with information received from the CIMOM 106, 108; and
4. The Object Retrieval Tool 604 returns the Storage Objects 602 to the calling function.

The Object Retrieval Tool has two primary types of tasks:

1. Given a storage entity's unique ID, get the Storage Object. Examples of this are: Get a Disk Array System's Storage Object given a Disk Array System's unique ID; Get a Volume's Storage Object given a volume's unique ID; Get a Storage Pool's Storage Object given a Storage Pool's unique ID.
2. Given a storage entity's unique ID, get all associated storage entities of a certain type. Examples of this are: Get all component Volumes given a Disk Array System's unique ID; Get all component Storage Pools, given a Disk Array System's unique ID; Get all volumes that a Host System can access, given the Host System's unique ID.

CIM Discover Tool 606:

The following is a discussion of the CIM Discover Tool 606: The CIM Discover Tool 606 is a Java module or set of Java modules that allow callers to obtain large amounts of information from a CIMOM 106, 108 with just one step. In alternative embodiments, the CIM Discover Tool 606 could be implemented in different programming languages. The CIM Discover Tool 606 uses the Object Retrieval Tool's 604 methods to fulfill a caller's request, and thus never directly calls the CIM Client API 506. The CIM Discover Tool 606 may be thought of as an API for management software applications using CIM.

The CIM Discover Tool 606 has three primary types of tasks:

1. Given a top level storage entity's unique ID, get all information about the storage entity and all of its components. An example of this is: Get Storage System Detail, including all component entity information (Volumes, Disks, DiskGroups, StoragePools, FCPorts, etc.). Returned information includes all relationships between component entities.
2. Given a component storage entity's unique ID, get all information about the storage entity and its subcomponents or relationships to other components. These tasks allow the calling function to get "sub-views" of the larger picture. This is the "middle ground" between getting information on the whole view or just a very small piece of information. An example of this is: Get StoragePool Detail, including a subcomponent entity information (Volumes and Disks).
3. Given a top-level storage entity type and a specific CIMOM, get all information about all entities of this storage entity type managed by this CIMOM, and all of their respective components. An example of this is: Get StorageSystem Details Given CIMOM including all component entity information (Volumes, Disks, DiskGroups, Storage-Pools, FCPorts, etc.). Returned information includes all relationships between component entities. The CIM Discover Tool 606 then forwards this request to the Object Retrieval Tool 604. The Object Retrieval Tool 604 makes a call to the CIM Client Library to get information about the existence of top-level entities of this type. Then, for each top-level entity, corresponding calls to the CIM Client Library, using the unique IDs of the entities, are made as usual.

C. Overall Sequence of Operation

Figure 7:
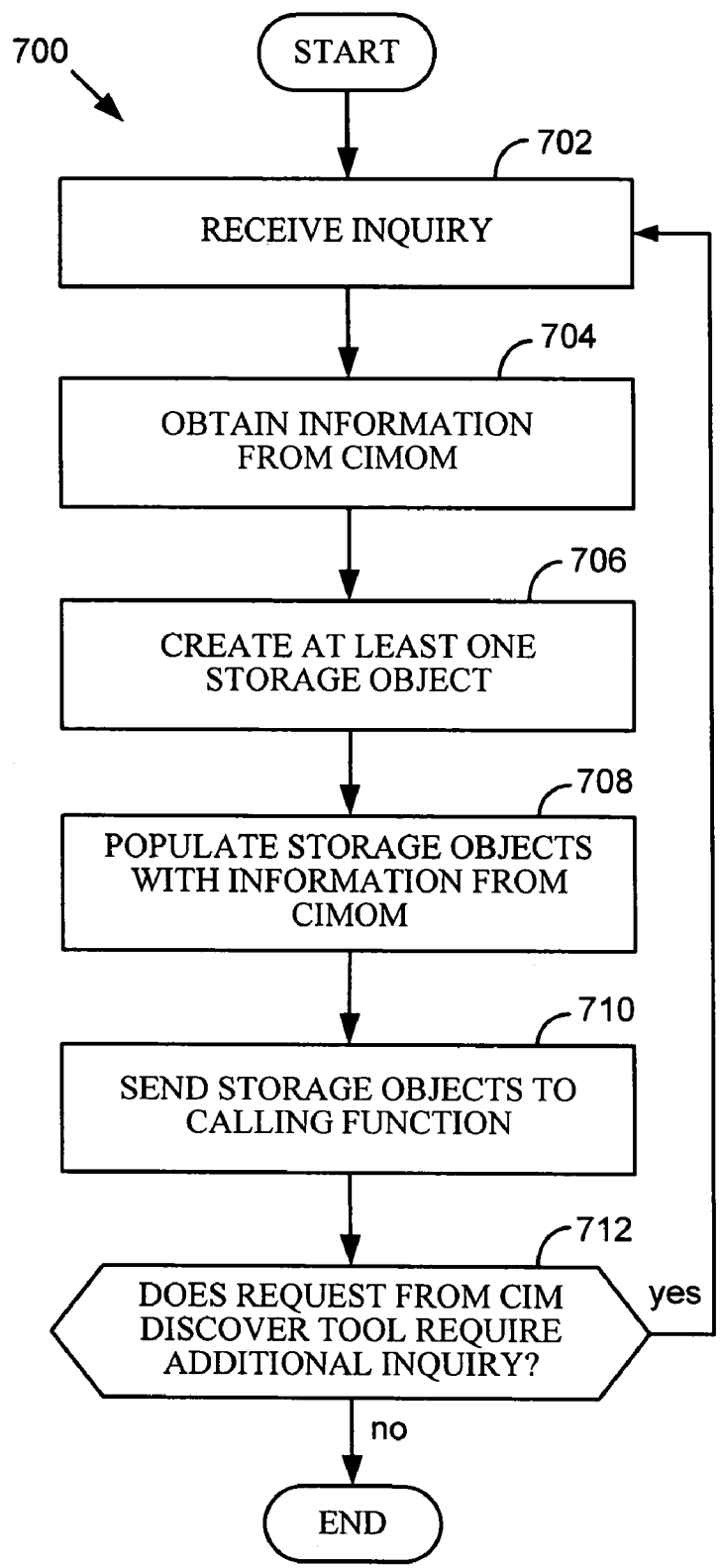
FIG. 7 is a flowchart of an operational sequence for responding to an inquiry in accordance with an example of the invention.

For ease of explanation, but without any intended limitation, the method aspect of the invention is described with reference to the computing system 100 described above and shown in FIG. 1. An example of the method aspect of the present invention is illustrated in FIG. 7, which shows a sequence 700 for a method for responding to an inquiry. As an example, the operations in the sequence 700 may be performed by host 102 or host 104. Alternatively, the operations could be performed by CIM server 106 or CIM server 108, or any suitable computing device in computing system 100 (which could include an ITSRM server).

Referring to FIG. 7, the sequence 700 may include, and begin with, operation 702 which comprises receiving an inquiry. As an example, the inquiry may be an inquiry for information concerning a storage entity. The inquiry may be received, for example, from a SRM CIM Client Application. Alternatively, the inquiry may be received from a CIM Discover Tool. As an example, the inquiry may include the unique ID of a designated storage entity, may be a request for a Storage Object corresponding with the designated storage entity. As another example, the inquiry may include the unique ID of a designated storage entity, and may be a request for all storage entities of a specified type associated with the designated storage entity. As another example, the inquiry may not include the unique ID of a designated storage entity, and may be a request for all storage entities of a specified top-level storage entity type.

Sequence 700 may also include operation 704, which comprises obtaining information from a CIMOM 106. Operation 704 may comprise using a CIM Client API to obtain requested information from the CIMOM 106.

Sequence 700 may also include operation 706, which comprises creating at least one Storage Object. Operation 706 may comprise creating a set of Storage Objects. Each Storage Object may be created by using a Java package comprising classes that define a plurality of storage entity objects. The plurality of storage entity objects may include Disk Array System, Storage Pool, Volume, Host System, FCPort (Fibre Channel Port), and Disk, objects. As an example, the Disk Array System object may be a top level object, and each object other than the Disk Array System object may be associated as a component of the Disk Array System object. As another example, for SAN Management, the top-level object may be an object that represents a SAN Fabric, and in another example, for management of a FibreChannel Switch, the top-level object may be an object that represents a FibreChannel Switch. In another example, the Disk Array System object may be a top level object, and at least one object other than the Disk Array System object may be a subcomponent of an object other than the Disk Array System object. In another example, the creating operation 706 may comprise creating a plurality of Storage Objects, wherein the Storage Objects have associations to each other that are consistent with corresponding storage entities' relationships modeled in a SMI/Bluefin profile. In another example, the creating operation 706 may comprise creating a plurality of Storage Objects, wherein properties of each Storage Object map directly to properties of at least one CIM Class used to represent a corresponding storage entity.

Sequence 700 may also include operation 708, which comprises populating the at least one Storage Object with information received from the CIMOM 106. Sequence 700 may also include operation 710, which comprises sending the at least one Storage Object to a calling function.

Sequence 700 may also include operation 712, which comprises determining if a request, for example received from the CIM discover tool, requires an additional inquiry. If so, operations 702-710 may be repeated. As an example, the inquiry may include the unique ID of an identified top level storage entity, and the receiving 702, obtaining 704, creating 706, populating 708, and sending 710 operations may be repeated to obtain information concerning the identified top level storage entity and all of the components of the identified top level storage entity. As another example, the inquiry may include the unique ID of a component storage entity, and the receiving 702, obtaining 704, creating 706, populating 708, and sending 710 operations may be repeated to obtain information concerning the component storage entity and subcomponents of the component storage entity. In another example, the inquiry may include the unique ID of a component storage entity, and the receiving 702, obtaining 704, creating 706, populating 708, and sending 710 operations may be repeated to obtain information concerning the component storage entity and the component storage entity's relationships to other components.

Many examples of the invention will benefit developers working on a CIM Client Application because these examples reduce development time and improve code maintainability, which allows for faster time to market for a CIM Client Application product.

The following are some examples of unique benefits of utilizing the SRM CIM Utilities 502:

Simplifies a CIM Client Application's 504 code for retrieving information from a CIMOM 106, 108:

Provides the ability to retrieve large amounts of information pertaining to a Storage Environment with one method call.

Provides the ability to retrieve specific pieces of information pertaining to a Storage Environment with simplified method calls.

No Code Redundancy:

The CIM Discover Tool 606 builds upon the Object Retrieval Tool 604. All CIM Discover Tool calls may be designed as a sequence of Object Retrieval Tool calls.

The design allows for easy code maintenance.

III. Other Embodiments

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

What is claimed is:

1. A computer implemented method for responding to an inquiry, comprising the following operations:

receiving a first single inquiry from a Common Information Model (CIM) client application including a unique ID of a top level storage entity, wherein the top level storage entity identified by the unique ID includes components associated as a component of the top level storage entity and a subcomponent of at least one component;

using CIM client Application Programming Interfaces (APIs) in response to the first single inquiry to obtain information from a CIM Object Manager (CIMOM) using the unique ID of the top level storage entity to obtain information on components and subcomponents of the top level storage entity from multiple CIM objects on the top level storage entity and components and subcomponents of the top level storage entity in the CIMOM;

creating a plurality of storage objects in a computer readable storage medium including information on the top level storage entity and components and subcomponents, and parent-child relationships among the top level storage entity and the components and subcomponents of the top level storage entity;

populating the created storage objects with information received from the CIMOM including identifying the entities in the top level storage entity and the parent child relationships of the top level storage entity, components and subcomponents, and wherein properties of each storage object map directly to properties of at least one CIM class used to represent the top level storage entity and components and subcomponents of the top level storage entity in the CIMOM;

returning information on the storage objects to the CIM client application that sent the first single inquiry; and receiving a second single inquiry including the unique ID of a component storage entity, wherein the receiving, obtaining, creating, populating, and sending operations are repeated to obtain information concerning the component storage entity and the component storage entity's relationship to other components.

2. The method of claim 1, wherein the plurality of storage objects include at least one of a disk away system object, storage pool object, volume object, host system, Fibre Channel object, Port object, and disk object.

3. The method of claim 2, wherein the top level storage entity comprises the disk array system object, and wherein each storage object other than the disk array system object is associated as a component of the disk array system object or a subcomponent of one of the components of the disk array system object.

4. The method of claim 1, wherein the creating operation comprises creating a plurality of storage objects, and wherein the storage objects have associations to each other that are consistent with corresponding storage entities' relationships modeled in a Storage Management Initiative Specification (SMI-S/Bluefin) profile.

5. The method of claim 1, wherein the inquiry is received from a Storage Resource Manager (SRM) CIM Client Application.

6. The method of claim 1, wherein the inquiry includes the unique ID for a disk array, wherein the components and subcomponents for which information is obtained comprise storage pools and disks, and wherein the relationships indicate a relationship of storage pools to the disk array system and of the disks to the storage pools.

7. A system in communication with a Common Information Model Object Manager (CIMOM) for responding to an inquiry from a host, comprising:

a processor; and a computer readable storage medium having code executed by the processor to perform operations, the operations comprising:

receiving a first single inquiry from a Common Information Model (CIM) client application including a unique ID of a top level storage entity, wherein the top level storage entity identified by the unique ID includes components associated as a component of the top level storage entity and a subcomponent of at least one component;

using CIM client Application Programming Interfaces (APIs) in response to the first single inquiry to obtain information from a CIMOM using the unique ID of the top level storage entity to obtain information on components and subcomponents of the top level storage entity from multiple CIM objects on the top level storage entity and components and subcomponents of the top level storage entity in the CIMOM;

creating a plurality of storage objects in a computer readable storage medium including information on the top level storage entity and components and subcomponents, and parent-child relationships among the top level storage entity and the components and subcomponents of the top level storage entity;

populating the created storage objects with information received from the CIMOM including identifying the entities in the top level storage entity and the parent child relationships of the top level storage entity, components and subcomponents, and wherein properties of each storage object map directly to properties of at least one CIM class used to represent the top level storage entity and components and subcomponents of the top level storage entity in the CIMOM; and returning information on the storage objects to the CIM client application that sent the first single inquiry; and receiving a second single inquiry including the unique ID of a component storage entity, wherein the receiving, obtaining, creating, populating, and sending operations are repeated to obtain information concerning the component storage entity and the component storage entity's relationships to other components.

8. The system of claim 7, wherein the plurality of storage objects include at least one of a disk away system object, storage pool object, volume object, host system object, Fibre Channel object, Port object, and disk object.

9. The system of claim 8, wherein the a top level storage entity comprises the disk array system object, and wherein each storage object other than the disk array system object is associated as a component of the disk array system object or a subcomponent of one of the components of the disk array system object.

10. The system of claim 7, wherein the first single inquiry is received from a SRM CIM Client Application.

11. A computer readable storage medium include code executed to communicate with a Common Information Model Object Manager (CIMOM) to respond to an inquiry from a host and to perform operations, the operations comprising:

receiving a single inquiry from a Common Information Model (CIM) client application including a unique ID of a top level storage entity, wherein the top level storage entity identified by the unique ID includes components associated as a component of the top level storage entity and a subcomponent of at least one component;

using CIM client Application Programming Interfaces (APIs) in response to the single inquiry to obtain information from a CIMOM using the unique ID of the top level storage entity to obtain information on components and subcomponents of the top level storage entity from multiple CIM objects on the top level storage entity and components and subcomponents of the top level storage entity in the CIMOM;

creating a plurality of storage objects in a computer readable storage medium including information on the top level storage entity and components and subcomponents, and parent-child relationships among the top level storage entity and the components and subcomponents of the top level storage entity;

populating the created storage objects with information received from the CIMOM including identifying the entities in the top level storage entity and the parent child relationships of the top level storage entity, components and subcomponents, and wherein properties of each storage object map directly to properties of at least one CIM class used to represent the top level storage entity and components and subcomponents of the top level storage entity in the CIMOM;

returning information on the storage objects to the CIM client application that sent the first single inquiry; and receiving a second single inquiry including the unique ID of a component storage entity, wherein the receiving, obtaining, creating, populating, and sending operations are repeated to obtain information concerning the component storage entity and the component storage entity's relationships to other components.

12. The computer readable storage medium of claim 11, wherein the plurality of storage objects include at least one of a disk array system object, storage pool object, volume object, host system object, Fibre Channel object, Port object, and disk object.

13. The computer readable storage medium of claim 12, wherein the top level storage entity comprises the disk array system object, and wherein each storage object other than the disk array system object is associated as a component of the disk away system object or a subcomponent of one of the components of the disk array system object.

14. The computer readable storage medium of claim 11, wherein the first single inquiry is received from a Storage Resource Manager (SRM) CIM Client Application.

15. The computer readable storage medium of claim 11, wherein the first single inquiry includes the unique ID for a disk array, wherein the components and subcomponents for which information is obtained comprise storage pools and disks, and wherein the relationships indicate a relationship of storage pools to the disk array system and of the disks to the storage pools.

* * * * *